UNITED STATES PATENT OFFICE.

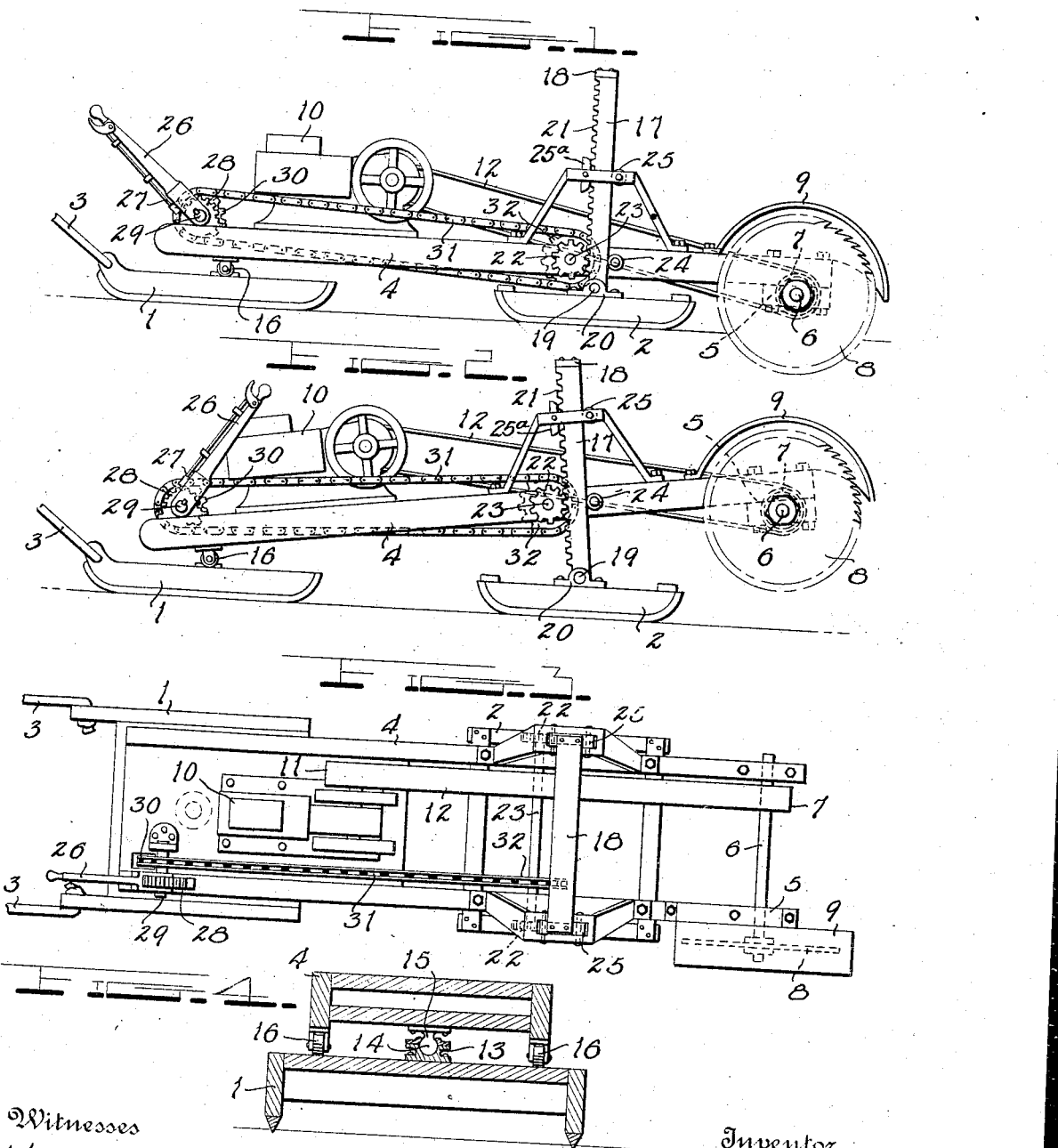

JOHN HILL, OF STORY CITY, IOWA.

ICE-SAWING MACHINE.

1,162,061.  Specification of Letters Patent.  Patented Nov. 30, 1915.

Application filed March 6, 1915. Serial No. 12,516.

*To all whom it may concern:*

Be it known that I, JOHN HILL, a citizen of the United States, residing at Story City, in the county of Story and State of Iowa, have invented certain new and useful Improvements in Ice - Sawing Machines, of which the following is a specification.

The present invention relates to certain new and useful improvements in ice sawing machines, and has for its object to provide a device of this character which embodies novel features of construction whereby it can be easily manipulated by a single man and will enable comparatively large quantities of ice to be quickly sawed.

Further objects of the invention are to provide an ice sawing machine which is comparatively simple and inexpensive in its construction, which can be readily moved from place to place, which enables the saw to be readily raised and lowered so as to be accurately set at the proper elevation, and which embodies few and durable parts such as are not liable to get out of repair.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a side elevation of an ice sawing machine constructed in accordance with the invention. Fig. 2 is a similar view showing the saw in a raised position. Fig. 3 is a top plan view of the ice sawing machine. Fig. 4 is a transverse sectional view through the front sled and the forward end of the main frame, showing the connection between the two members, the main operating lever and the mountings therefor being removed.

Corresponding and like parts are referred to in the following description and indicated in all the views of the drawings by the same reference characters.

Specifically describing the present embodiment of the invention, the numeral 1 designates a front sled, and 2 a rear sled, both of the sleds being provided with runners having sharp or V shaped edges so as to cut into and run freely upon the surface of the ice. The front sled 1 may be provided with some suitable means such as the rope 3 for drawing the sawing machine across the ice and moving the same in the required manner.

The main frame or bed 4 of the machine is mounted upon the two sleds 1 and 2 and projects rearwardly beyond the rear sled 2 where the overhanging end thereof is provided with bearings 5 within which a saw shaft 6 is journaled. One end of the saw shaft 6 is provided with a drive pulley 7 while the opposite end thereof is provided with a saw 8 of the conventional construction.

A suitable guard 9 surrounds the upper portion of the saw 8 to prevent any exterior objects from coming into contact therewith.

Mounted upon the forward portion of the bed or frame 4 is an engine 10 which may be of any conventional form, the pulley 11 of the engine being connected by an endless belt 12 to the drive pulley 7 of the saw so that the latter is driven by the engine.

The forward end of the main frame 4 is loosely connected to the front sled 1 so as to be susceptible of having both a swinging and tilting movement with respect thereto. As shown upon the drawing the front sled 1 is formed with a socket 13 which receives a ball 14 at the lower end of a stem 15 projecting downwardly from the frame 4.

Upon each side of the stem 15 the frame 4 is provided with rollers 16 which engage the top of the sled 1 so as to provide a firm support for the main frame 4 and prevent vibration thereof when the engine 10 is running. The front sled 1 can be readily swung laterally in the manner necessary for guiding and directing the forward movements of the machine, and the main frame 4 can be tilted vertically for the purpose of raising and lowering the saw 8. In this connection it will be noted that the center of the ball 14 is substantially in transverse alinement with the pivots of the rollers 16 so that there will be no binding or looseness when the rear end of the main frame is swung up and down.

Projecting upwardly from opposite sides of the rear sled 2 are standards 17 which are connected at their upper ends by a cross bar 18 and are pivotally mounted at their lower ends so as to have a limited backward and forward swinging movement. In the present instance the lower ends of the standards 17 are shown as pivoted at 19 to brackets 20 applied to opposite sides of the rear sled 2. The forward faces of the standards 17 are provided with racks 21 which mesh with pinions 22 on opposite ends of a transverse shaft 23 which is journaled upon the main frame 4. The main frame 4 has a sliding engagement with the standards 17, being shown in the present instance as provided with suitable guide means such as the rollers 24 for engaging the standards. Vertical side frames project upwardly from opposite sides of the main frame 4 and also have a sliding engagement with the standards 17, being shown as provided with rollers 25 for engaging the back thereof and blocks 25ª engaging the front thereof. With this construction it will be obvious that by rotating the shaft 23 and causing the pinions 22 to travel up or down upon the racks 21, the saw 8 can be raised or lowered as desired and set at any elevation.

A main lever 26 is provided at the front of the main frame 4, said lever carrying a latch 27 for engagement with a segmental rack 28 and being keyed upon a shaft 29 which is suitably journaled upon the main frame 4 and has a gear wheel 30 rigidly applied thereto. An endless chain 31 connects the gear wheel 30 with a second gear wheel 32 rigid with the transverse shaft 23. By swinging the lever 26 forward or backward the gear wheel 30 can be rotated and motion transmitted therefrom to the second gear wheel 32 and transverse shaft 23 so as to cause the pinions 22 to travel upon the racks 21 and either raise or lower the rear ends of the main frame 4. The standards 17 are mounted so that they can have the slight swinging movement necessary to accommodate this up and down movement of the main frame. After the saw has been set at the desired elevation, it can be locked in position by causing the latch 27 to engage the segmental rack 28.

Having thus described the invention, what I claim as new and desire to secure by Letters Patent, is:—

1. An ice sawing machine including movable supporting means formed with a front section and a rear section, a main frame loosely connected at one end thereof to the front section of the movable supporting means so that the opposite end thereof can swing up and down, a saw upon the said swinging end of the main frame, standards projecting from the rear section of the said movable supporting means, racks upon the standards, side frames projecting upwardly from the main frame, guide means upon the side frames and main frame for slidably engaging standards, a transverse shaft journaled upon the main frame, pinions rigid with the transverse shaft and meshing with the racks of the standards, and means for rotating the transverse shaft to raise and lower the swinging end of the main frame and adjust the elevation of the saw.

2. An ice sawing machine including a movable support formed with a front section and a rear section, a main frame having one end thereof loosely connected to the front section of the movable support so that the opposite end thereof can swing up and down, a saw mounted upon the said swinging end of the main frame, standards projecting from the rear section of the movable support and pivotally connected thereto, guide means upon the main frame engaging the standards, side frames projecting upwardly from the main frame, guide means upon the side frames for engaging the standards, racks upon the standards, pinions carried by the main frame and meshing with the racks, and means for rotating the pinions to raise and lower the main frame to adjust the elevation of the saw.

3. An ice sawing machine including a movable support formed with a front section and a rear section, a main frame having one end thereof loosely connected to the front section of the movable support so that the opposite end thereof can swing up and down, a saw mounted upon the said swinging end of the main frame, standards projecting upwardly from the rear section of the movable support and pivotally connected thereto, guide means upon the main frame engaging the standards, side frames projecting upwardly from the main frame, guide means upon the side frames for engaging the standards, racks upon the standards, a transverse shaft journaled upon the main frame, pinions rigid with the shaft and meshing with the racks, a second shaft journaled upon the main frame, a chain and sprocket connection between the transverse shaft and the second shaft, and a lever for operating the second shaft to rotate the pinions and raise and lower the swinging end of the main frame to adjust the elevation of the saw.

4. An ice sawing machine including movable supporting means formed with a front section and a rear section, a main frame loosely connected to the front section of the movable supporting means so that the opposite end thereof can swing up and down, a saw mounted upon the said swinging end of the main frame, standards projecting upwardly from the rear section of the supporting means, guide means carried by the main frame for engaging the standards, racks upon the standards, a transverse shaft journaled upon the main frame, pinions carried by the transverse shaft and meshing with the racks of the standards, a second shaft journaled upon the frame, a chain and sprocket connection between the transverse shaft and the second shaft, and a lever applied to the second shaft for rotating the same to operate the pinions and raise and lower the swinging end of the main frame to adjust the elevation of the saw.

In testimony whereof I affix my signature in presence of two witnesses.

JOHN HILL.

Witnesses:
 ISAAC HOPE,
 MARTIN FLATTELO.

Copies of this patent may be obtained for five cents each, by addressing the "Commissioner of Patents, Washington, D. C."